UNITED STATES PATENT OFFICE.

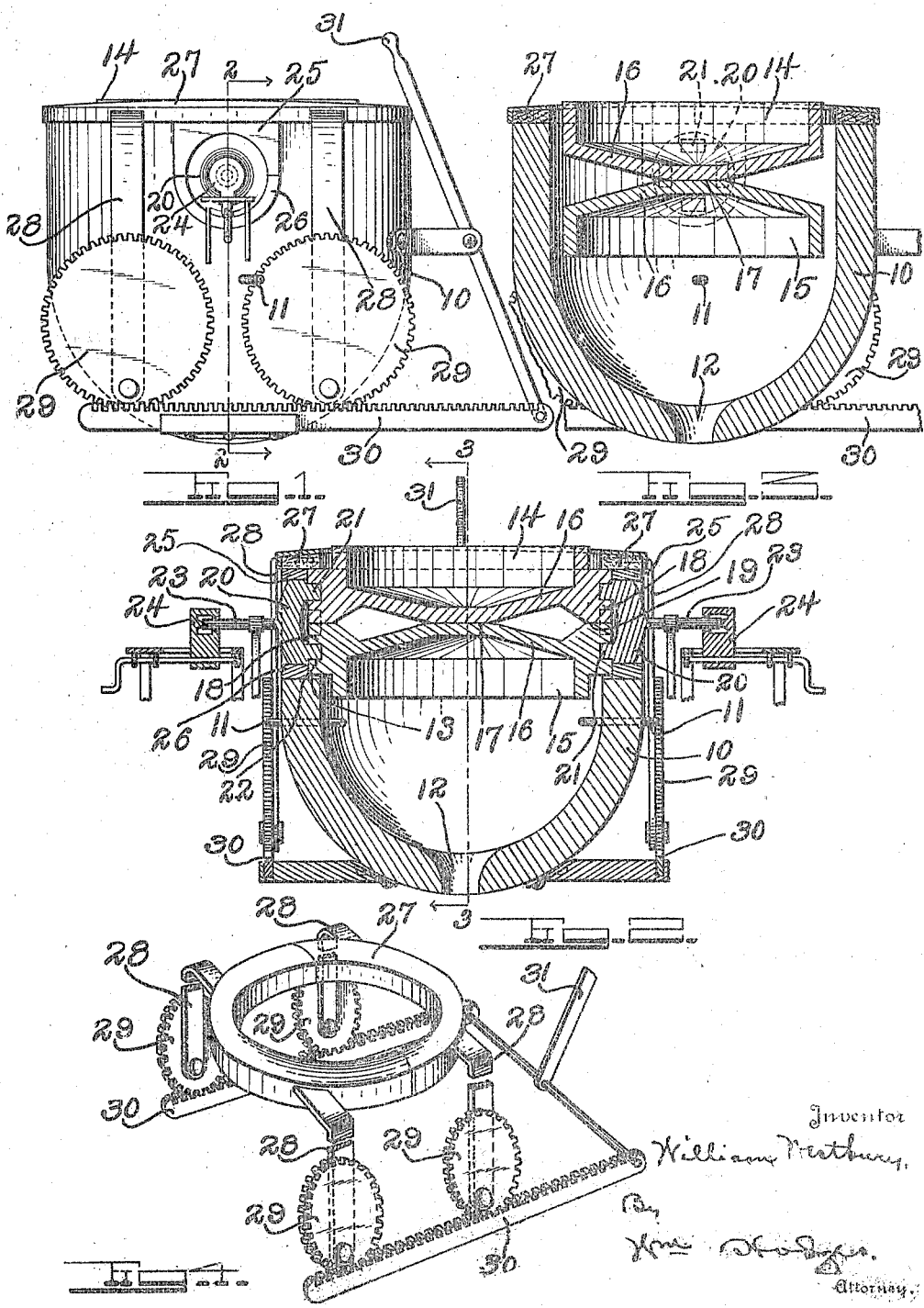

WILLIAM WESTBURY, OF OKMULGEE, OKLAHOMA.

GLASS-DRAWING APPARATUS.

1,249,868.　　　　Specification of Letters Patent.　　Patented Dec. 11, 1917.

Application filed May 10, 1916. Serial No. 96,615.

*To all whom it may concern:*

Be it known that I, WILLIAM WESTBURY, a citizen of the United States, residing at Okmulgee, in the county of Okmulgee and State of Oklahoma, have invented new and useful Improvements in Glass-Drawing Apparatus, of which the following is a specification.

This invention is an improved glass pot and kiln of the type employed in glass drawing apparatus.

It is common practice in the glass drawing art, to employ rotatable glass pots of double form, *i. e.*, having oppositely arranged glass receiving cavities, with a single bottom wall between them, so arranged that one cavity is inverted during the drawing operation from the other cavity. The heat maintained within the kiln tends to keep the lower part of the glass bath in the uppermost cavity, at the desired temperature, and also tends to melt out any glass remaining in the inverted cavity, during the drawing from the said uppermost cavity. In practice, however, it has been found necessary to tilt the pot at an angle after each draw, before turning it over to bring the previously inverted cavity into position to receive the next charge, so that the glass will be caused to run down smoothly on the bottom of the cavity from which the draw has just been made. Should the pot be reversed without first tilting the same, as above mentioned, knobs or projections of glass will form upon the bottom of the cavity from which the last draw was made, which knobs or projections will seriously affect the quality, causing blisters, etc., during the next draw, unless removed, it being impossible to remove them, however, without considerable loss of time and waste of heat.

One of the objects of the present invention is to provide a rotatable pot of the type above referred to, having cavities so constructed that the pot may be at once inverted, and any knobs or projections which might form on the bottom of the last used cavity, may be melted off during the period required for the draw from the other cavity. A further object is to provide means whereby heat may be introduced between the cavities, to maintain all parts of the pot at uniform temperature, and to equalize the expansion caused by molten glass entering either cavity when in drawing position. A further object is to provide improved means for moving the top stone of the kiln to permit of rotation of the pot.

The invention will be hereinafter fully set forth and particularly pointed out in the claims.

In the accompanying drawing:—

Figure 1 is a side elevation illustrating a glass pot and kiln constructed in accordance with the invention. Fig. 2 is a longitudinal sectional view on the line 2—2 Fig. 1. Fig. 3 is a similar sectional view on line 3—3 Fig. 2. Fig. 4 is a detail view illustrating the top stone operating mechanism.

Referring to the drawing, 10 designates a kiln, which may be of any preferred type, provided with the burners 11, and the outlet opening 12 in its bottom. Said kiln is also provided with oppositely disposed vertical slots 13 at its upper edge.

The glass pot is of the invertible or twin type, being formed of two cavity sections 14 and 15, each being a duplicate of the other, and each having its own independent bottom wall 16, shaped to form a frusto conical bottom for the pot, said bottom wall being of substantially uniform thickness throughout. The bottom walls 16 rest one upon the other, or abut at their centers, as indicated at 17, to provide an annular heating space, and each pot is provided with oppositely disposed trunnion members 18, of semi-circular form, the flat sides 19 of said members abutting each other, in alinement with the abutting portions 17, to form circular trunnions which project above the curved bottoms of the slots 13. The trunnions are shaped to span the heating space. The sections 14 and 15 may be locked in any suitable manner, so as to turn in unison upon the trunnions. In the drawing, the construction illustrated for this purpose, comprises circular locking heads 20, having their inner faces provided with locking lugs 21, shaped to enter recesses 22 formed in the trunnions 18, said locking heads being provided with short shafts 23 mounted in adjustable bearings 24, of well known construction. The locking heads 20 are preferably of concaveconvex form, the concaved face being on the inside and provided with the lugs 21, said locking heads being surrounded by sectional blocks 25 and 26, to fill the slots 13.

The top stone 27 may be of any preferred construction, but as illustrated in the drawing is made in the form of an arch, flat across the bottom so that it cannot crack and fall out of the metal jacket, said top stone being formed of two sections, each having a semi-circular opening to conform to the contour of the glass drawing pot. The sections of the top stone are supported by operating arms 28, eccentrically connected by crank pins with pinions 29, which mesh with racks 30, extending on opposite sides of the kiln, a lever 31 being provided to shift said rack longitudinally. The glass pot is rotated in any well known manner, the rotating mechanism being conventionally illustrated.

In operation, the uppermost glass pot, 14 for instance, is filled with molten glass in the usual way, and the drawing operation completed in accordance with accepted practice. It will be noted that by reason of the conical shape of the bottoms of the pots, a substantially annular space is formed between the pots, permitting the heat to pass in between the pots, whereby all parts thereof are maintained at a uniform temperature, and no unequal expansion results by reason of molten glass being placed in the uppermost pot. Likewise any knobs or projections of glass which may have formed on the bottom of the pot 15 for instance, are quickly melted off by the heat in the space between the bottoms of the pots, as well as by the heat from the burners 11 impinging directly thereagainst. After the drawing operation has been completed from the pot 14, the lever 31 is operated to shift the rack 30, which results in the elevation of the sections of the top stone 27 in a horizontal position, by the gears 29. The pots are then reversed by means of rotating power applied to the shaft 23, bringing pot 15 to the top, and inverting pot 14. As soon as the pots are reversed, the lever 31 is reversed, effecting the lowering of the top stone, whereupon the drawing operation may be at once started. As the drawing operation progresses, and before its completion, the inverted pot is thoroughly cleansed of any particles of glass adhering thereto, so that no delay is necessary after any of the drawing operations, as each pot is ready for use before it is brought to drawing position.

Having thus explained the nature of my invention, and described an operative manner of constructing and using the same, although without attempting to set forth all of the forms in which it may be made, or all of the forms of its use, what I claim is:

1. An improvement in glass drawing apparatus comprising a reversible glass drawing pot formed of two separable cavity sections having abutting bottom walls and abutting trunnion members, an annular space being provided between the sections, said trunnion members bridging said space, and means for normally preventing separation of the sections.

2. An improvement in glass drawing apparatus comprising a reversible glass drawing pot formed of two separable cavity sections provided with frusto-conical bottoms the flat portions of which are abutted, the contiguous conical portions forming an annular space, said sections being provided with abutting trunnion members bridging said space, and means for normally preventing separation of the sections.

3. An improvement in glass drawing apparatus comprising a reversible glass drawing pot formed of two separable cavity sections having abutting bottom walls and abutting trunnion members, an annular space being provided between the sections, said trunnion members bridging said space, and rotatable supporting members having means for normally preventing separation of the sections.

4. An improvement in glass drawing apparatus comprising a reversible glass drawing pot formed of two separable cavity sections having abutting bottom walls and abutting trunnion members, an annular space being provided between the sections, said trunnion members bridging said space, locking heads, said locking heads and trunnions having complemental interengaging portions, and means for rotatably supporting said heads.

5. An improvement in glass drawing apparatus comprising a reversible glass drawing pot formed of two separable cavity sections having abutting bottom walls and abutting trunnion members, an annular space being provided between the sections, said trunnion members bridging said space, circular locking heads of concavo-convex form, the concave sides of said heads having lugs engaging said trunnions, and means for rotatably supporting said locking heads.

6. As an improvement in glass drawing apparatus, a reversible pot having oppositely arranged glass receiving cavities, a top stone having an opening through which said pot may project, rigid arms depending from said top stone, pinions to which the lower ends of said arms are eccentrically connected, and means for simultaneously actuating all of said pinions to raise and lower the top stone.

7. As an improvement in glass drawing apparatus, a reversible pot having oppositely arranged glass receiving cavities, a sectional top stone having an opening through which said pot may project, operating arms depending from the respective sections of the top stone, pinions to which the lower ends of said arms are eccentrically connected, racks engaging said pinions, and means for simultaneously shifting said racks.

In testimony whereof I have hereunto set my hand in presence of two subscribing witnesses.

WILLIAM WESTBURY.

Witnesses:
W. P. ROBISON,
H. L. GREENWALT.